3,041,175
PROCESS FOR THE PRODUCTION OF SPARKLING APPLE CIDER

Francis E. Atkinson, West Summerland, and John F. Bowen, Penticton, British Columbia, Canada, assignors to Canadian Patents and Development Limited, Ottawa, Ontario, Canada
No Drawing. Filed Jan. 29, 1959, Ser. No. 789,806
5 Claims. (Cl. 99—36)

This invention relates to a process for producing an alcoholic cider from dessert varieties of apples.

Cider, as made outside North America, is an alcoholic beverage made from apples. It is produced by the vinous fermentation of the expressed juice of the fruit. It is usual to employ as the fruit special vintage varieties which because of certain chemical and other characteristics render them suitable for production of a beverage of fine quality. A feature of such fruit varieties is that they are unsuited for the most part for general edible or table use. In other words, the dessert varieties of apples are unsuitable for the production of good quality cider. As a result, in those countries where a true vintage fruit can be grown, making of fine cider is a flourishing commercial industry whereas in those countries such as Canada and the United States, where dessert varieties of apples constitute the major apple production, good quality alcoholic cider is not manufactured in appreciable quantity.

Attempts have been made to produce alcoholic cider from dessert varieties of apples, such as Delicious, but the finished cider is a brown or amber color (as compared with the almost water whiteness of fine quality ciders) and has a flavor that is not attractive and may be described as bitter.

It is an object of this invention to provide a process for manufacturing in a convenient and effective manner fine quality alcoholic cider from dessert varieties of apples.

It is believed that failure to make a palatable cider from dessert varieties of apples has been due to the fact that oxidation has been allowed to continue in the apple juice from the time the apples were milled and pressed and through the fermentation stage until the cider was eventually pasteurized. These oxidative changes have resulted in various unattractive flavors. The oxidation is caused by the peroxidase enzymes in the apple flesh which assist the oxygen present in the air and the tissue of the fruit to react with substances in the cells associated with color and flavor.

The present invention contemplates the production of cider from dessert varieties of apples utilizing the conventional steps of milling the fruit to produce a pulp, pressing the juice from the pulp, clarifying and filtering the juice, and finally fermenting the clarified juice. However, in accordance with the invention, oxidation is prevented by adding sulphur dioxide in the form of sulphurous acid or various salts such as potassium meta bisulphite, calcium bisulphite, or sodium sulphite, to the apples during the milling step, to the pulp immediately after the milling step, or to the juice as it flows from the press.

Sulphur dioxide is also a very desirable constituent in vinous fermentation since it prevents the growth of undesirable organisms. Thus, the addition of sulphur dioxide will serve the dual purpose of preventing oxidation and growth of undesirable organisms.

In accordance with the invention, apples of one or more sweet varieties are blended to produce a pulp and the juice extracted therefrom. It is desirable that the acid content be of 0.375% to 0.45% in the extracted juice. A variety of apples such as Delicious has an average acid content of 0.27% and, in such case, dessert varieties such as Jonathan, Newtown, Northern Spy, Rome Beauty, Russet, Stayman, Winesap, Wagener, having an acid content of 0.45% or more may be blended therewith to produce the desired acid content.

The sulphur dioxide may be added in any convenient manner. Thus, it may be in the form of a solution and may be pumped directly into the pulp or into the extracted juice before fermentation. A preferred concentration is a solution containing 2% $SO_2$ but the concentration may vary from 0.5% to 6% $SO_2$. Sulphur dioxide is very volatile and thus a portion of it becomes lost during handling. However, it has been found that a 2% solution is sufficiently strong so that large quantities of liquid are not required and yet is not subject to an excessive loss during handling.

The quantity of $SO_2$ employed may vary from 75 to 200 parts per million in the freshly expressed juice. The first consideration is that the pulp and juice resulting from the milling of the apples must be kept in a creamy white condition or at least in whatever color is natural to the apple flesh of the varieties being used. The second consideration is that 100 to 150 parts per million is necessary in the wine to prevent growth of undesirable organisms. Thus, 100 to 150 parts per million may be added depending upon the quantity required to keep the fresh pulp and juice in its natural white or like condition.

The extracted juice is now clarified as, for instance by adding 0.1% pectinase clarifying enzyme, and heated to 75° F. to 120° F. to increase the activity of the enzyme pectinase.

The clarified juice is now filtered in a conventional manner. The sugar content of the juice may now be adjusted to produce a desired alcoholic content in the finished cider. Such content may be chosen as desired but a suitable commercial form of cider has approximately 5.7% by volume alcohol.

The resulting juice may either be at once fermented or concentrated for later fermentation to produce cider.

The fermentation step may be carried out by inoculating the juice with a wine yeast such as Tokay wine yeast or Lager brewer yeast. The use of such a yeast results in rapid fermentation at a temperature of approximately 77° F. The fermentation is allowed to continue until the total soluble solids content, as estimated by a refractometer, has been reduced to about 8.2%. The fermented juice may then be chilled to about 29–30° F., filtered, carbonated, bottled and pasteurized.

If the juice is to be concentrated for later manufacture into cider, it is boiled under a vacuum of say, at least 20 inches of mercury, to increase the total soluble solids content to 72 to 75%, as estimated with a refractometer. The sugar content in the resulting concentrate is 70% or more. Such a concentrate will of course keep for long periods because of the high sugar content. The concentrate when rediluted is the same color as the original juice.

We claim:

1. A method of producing cider which comprises providing a batch consisting of apples of North American dessert variety the juice of which has an acid content not exceeding 0.45%, milling said batch to produce an apple pulp, immediately adding to said pulp sulfur dioxide in the proportion of 100 to 150 parts sulfur dioxide to one million parts of the juice in said pulp to prevent oxidation thereof, pressing said pulp following said addition to product apple juice, and subsequently fermenting said juice.

2. A method of producing cider which comprises providing a batch consisting of apples of a plurality of North American dessert varieties the composite juice of which has an acid content of 0.375% to 0.45%, milling said batch to produce an apple pulp, immediately adding to said pulp sulfur dioxide in the proportion of 100 to 150 parts sulfur dioxide to one million parts of the juice in said pulp to prevent oxidation thereof, pressing said pulp following said addition to produce apple juice, and subsequently fermenting said juice.

3. A method of producing cider which comprises blending apples of a plurality of North American dessert varieties to produce a batch of apples the composite juice of which has an acid content of 0.375% to 0.45%, milling said batch to produce an apple pulp, immediately adding to said pulp sulfur dioxide in the proportion of 100 to 150 parts sulfur dioxide to one million parts of the juice in said pulp to prevent oxidation thereof, pressing said pulp following said addition to produce apple juice, and subsequently fermenting said juice.

4. A method of producing cider which comprises blending apples of North American dessert variety the juice of which has an acid content greater than 0.45% with apples of North American dessert variety the juice of which has an acid content below 0.375% to produce a batch of apples the composite juice of which has an acid content of 0.375% to 0.45%, milling said batch to produce an apple pulp, immediately adding to said pulp sulfur dioxide in the proportion of 100 to 150 parts sulfur dioxide to one million parts of the juice in said pulp to prevent oxidation thereof, pressing said pulp following said addition to produce apple juice, and subsequently fermenting said juice.

5. A method of producing cider which comprises blending apples of North American dessert variety the juice of which has an acid content greater than 0.45% with apples of North American dessert variety the juice of which has an acid content below 0.375% to produce a batch of apples the composite juice of which has an acid content of 0.375% to 0.45%, milling said batch to produce an apple pulp, immediately adding to said pulp sulfur dioxide in the proportion of 100 to 150 parts sulfur dioxide to one million parts of the juice in said pulp to prevent oxidation thereof, pressing said pulp following said addition to produce apple juice, clarifying said juice at a temperature of at least 75° F., filtering the clarified juice, inoculating the filtered juice with a wine yeast, and allowing the inoculated juice to ferment.

References Cited in the file of this patent

Cruess: "Commercial Fruit and Vegetable Products," published by McGraw-Hill, New York, 3rd ed., 348, p. 749.

"Principles and Practice of Wine Making," by Cruess, W. V., 1947, published by the Avi Publishing Co. Inc., New York, pp. 282–290.

Text "Fruit and Vegetable Juice Production," by Tressler and M. A. Joslyn, published 1954 by the Avi Publishing Co. Inc., New York, pp. 191, 192, 196, 198, 202, 534, 535, and 547.